United States Patent [19]

Windgassen et al.

[11] 4,210,437
[45] Jul. 1, 1980

[54] LIQUID FERTILIZER FOR SUPPLY OF SULFUR, NITROGEN AND MICRONUTRIENT METALS

[75] Inventors: Richard J. Windgassen, Wheaton; Louis E. Ott, Oswego, both of Ill.

[73] Assignee: Standard Oil Company (Indiana), Chicago, Ill.

[21] Appl. No.: 969,441

[22] Filed: Dec. 14, 1978

[51] Int. Cl.$^2$ ............................ C05C 9/00; C05C 3/00
[52] U.S. Cl. ............................................ 71/28; 71/61; 71/63; 71/64 C; 210/57; 423/514
[58] Field of Search ............... 71/61, 63, 59, 64 C, 71/54, 65, 60, 3, 4, 28; 423/514, 265, 385, 352; 210/57; 252/189

[56] References Cited

U.S. PATENT DOCUMENTS

| 1,803,157 | 4/1931 | Wesenberg et al. ............... 71/65 X |
| 1,880,058 | 9/1932 | Vannah ................................... 71/65 |
| 2,957,762 | 10/1960 | Young ................................... 71/59 |
| 3,130,034 | 4/1964 | Young ................................ 71/54 X |
| 3,493,337 | 2/1970 | Every et al. ...................... 71/61 X |
| 3,620,708 | 11/1971 | Ott ................................ 71/64 C X |
| 3,930,832 | 1/1976 | Sansing et al. ................ 71/64 C X |

Primary Examiner—Kenneth M. Schor
Attorney, Agent, or Firm—Richard A. Kretchmer; William T. McClain; William H. Magidson

[57] ABSTRACT

An aqueous solution of ammonium thiosulfate, ammonia and at least one metal compound selected from the group consisting of the oxides and salts of copper, zinc and manganese provides a source of sulfur, nitrogen and micronutrient metals for fertilizer use.

11 Claims, No Drawings

LIQUID FERTILIZER FOR SUPPLY OF SULFUR, NITROGEN AND MICRONUTRIENT METALS

BACKGROUND OF THE INVENTION

1. Field of the Invention

This invention relates to a liquid fertilizer composition which is capable of supplying sulfur, nitrogen and micronutrient metals for plant nutrition. More particularly, it relates to an aqueous solution of ammonium thiosulfate, ammonia and at least one metal compound selected from the group consisting of the oxides and salts of copper, zinc and manganese.

2. Description of the Prior Art

Plants require a variety of materials for adequate nutrition. The principal materials are carbon dioxide and water, which provide the elements of carbon, hydrogen and oxygen, and which are usually available in adequate amounts from both soil and atmosphere. The supply of carbon dioxide and water is continually replenished by natural phenomena. All the other essential nutrients are normally available from the soil, but they are not replenished by nature after the plant takes them up into its foilage and fruit. When the plant is removed from the soil for consumption, in contrast to the natural cycle of return to the soil, the soil nutrient supply is reduced, and the application of fertilizer becomes necessary in time.

Thirteen elements, which are normally drawn from the soil, are currently known to be essential to plant nutrition. These elements consist of nitrogen, phosphorus, potassium, calcium, magnesium, sulfur, iron, manganese, copper, zinc, boron, molybdenum and chlorine. Of these thirteen elements, nitrogen, phosphorus and potassium are needed by plants in relatively large quantities and are therefore called macronutrients. Calcium, magnesium, and sulfur are generally required in lesser but still substantial amounts and are classified as secondary nutrients. The remaining members of the group are known as micronutrients since they are required in very small amounts for plant growth.

Plants obtain sulfur from both the soil and the air. In the soil, sulfur is ordinarily present either in the form of sulfur containing inorganic minerals or as organic sulfur compounds in the soil organic matter or humus. In the air, sulfur is primarily present in the form of sulfur dioxide which can be directly absorbed by the leaves of plants. In addition, sulfur dioxide from the air is also carried into the soil by rain water where it may be absorbed by plants.

The discharge of sulfur oxides into the air by some large industrial centers is sufficiently large to ensure that a sulfur deficiency does not develop in nearby agricultural land. This, however, is not the case for agricultural land which is remote from such sources of atmospheric sulfur oxides. In view of limitations on the natural supply of sulfur from both air and soil, a sulfur deficiency is not uncommon in agricultural soils. Such a deficiency frequently occurs in well-leached soils containing little organic matter which are located in areas far from sources of sulfur dioxide atmospheric pollution. Crops which appear to be particularly sensitive to a sulfur deficiency include corn, sugar cane, wheat, sugar beets, and legumes such as alfalfa and peanuts.

One of the most satisfactory sources of sulfur for plant nutrition is ammonium thiosulfate, which simultaneously serves as a source of nitrogen. In addition, ammonium thiosulfate contains more sulfur per unit weight than ammonium sulfate which is a widely used fertilizer material. Ammonium thiosulfate is conveniently handled as a concentrated aqueous solution and is compatible with many liquid fertilizer solutions. It is compatible with neutral phosphates, aqueous ammonia, nitrogen solutions containing ammonium nitrate, urea solutions, and most nitrogen, nitrogen-phosphorus, or complete fertilizer solutions.

Although micronutrient metals can be separately applied to agricultural soil, it is generally more convenient to incorporate these micronutrients into conventional mixed fertilizers which are used to supply nutrients such as nitrogen, phosphorus, potassium and sulfur. The satisfactory incorporation of micronutrient metals into a solid mixed fertilizer is a major problem because of difficulties such as the uniform incorporation of the small amounts of material and the prevention of segregation from mixing. These specific difficulties can be avoided by incorporating the micronutrient metals into a liquid fertilizer. Unfortunately, many of the metal compounds conventionally employed as a source of micronutrient metals are of limited solubility in many conventional liquid fertilizer compositions which are used to supply nutrients such as nitrogen, phosphorus, potassium and sulfur.

In view of the desirable characteristics of aqueous ammonium thiosulfate solutions as a source of sulfur, there has been a need for a satisfactory method of incorporating micronutrient metals into such solutions. This has been a substantial problem in the past since micronutrient metals such as copper, zinc and manganese form thiosulfates which precipitate from solution at the concentrations that are required for efficient transportation and storage.

U.S. Pat. Nos. 3,854,923; 3,909,229; and 3,997,317 are directed to a micronutrient composition consisting of a solution in anhydrous or aqueous ammonia of a zinc alkanoate which contains from 1 to 6 carbon atoms. These patents teach that the zinc salts of low molecular weight alkanoic acids are desirable sources of zinc for use in combination with ammonia as a consequence of their relatively high solubility in aqueous or anhydrous ammonia. These patents do not, however, suggest for any purpose the preparation of a fertilizer composition by mixing water, ammonium thiosulfate, ammonia and at least one metal compound selected from the group consisting of the oxides and salts of copper, zinc and manganese.

Similarly, U.S. Pat. No. 4,007,029 discloses the preparation and use of a liquid fertilizer composition which comprises anhydrous ammonia, at least one trace element selected from the group consisting of boron, copper, magnesium, manganese and molybdenum, and wherein a compound such as ammonium acetate, magnesium acetate or sodium acetate can be used to solubilize the trace element. This patent fails to suggest, for any purpose, the combination of water, ammonium thiosulfate, ammonia and at least one metal compound selected from the group consisting of the oxides and salts of copper, zinc and manganese.

U.S. Pat. No. 2,976,138 is directed to the discovery that a stable aqueous solution of micronutrient metals can be prepared by solubilizing the metals with ammonia and ammonium sulfate. It is taught that the ammonium sulfate assists in the formation of complex ammoniacal sulfate salts of the metals which afford a stable aqueous solution at relatively high metal concentrations. This stabilized micronutrient solution has not been entirely satisfactory, however, as a consequence of its relatively low sulfur content and the tendency of manganese to oxidize to manganic oxides and precipitate from solution. The disclosure contains no suggestion that an aqueous solution prepared by mixing water, ammonium thiosulfate, ammonia and at least one metal compound selected from the group consisting of the oxides and salts of copper, zinc and manganese would be free of such deficiencies. Indeed, the disclosure fails to suggest the possibility that such a solution could be prepared.

In addition, U.S. Pat. No. 2,957,762 discloses the use of a water-soluble stable ammine complex salt of a metal selected from Groups Ib, IIb, VIa and VIII of the Periodic Table to inhibit the corrosive activity toward ferrous metal of aqueous ammonia solutions of ammonium salts of strong mineral acids. The ammine complex salt disclosed by this patent is used at a concentration of between about 0.0001 and about 0.01 part by weight per part of the combined weight of the ammonia and ammonium salt. This patent fails to suggest the possibility of preparing a solution containing a high metal content by mixing water, ammonium thiosulfate, ammonia and at least one metal compound selected from the group consisting of the oxides and salts of copper, zinc and manganese. The patent is directed solely to the ammonium salts of strong mineral acids whereas the ammonium thiosulfate of this invention is not such a salt. In addition, the patent fails to suggest the possibility of attaining the high metal concentrations which are made possible by the present invention.

SUMMARY OF THE INVENTION

A liquid fertilizer composition capable of providing sulfur, nitrogen and micronutrient metals has been discovered which comprises an aqueous solution of ammonium thiosulfate, ammonia and a metal source comprising at least one metal compound selected from the group consisting of the oxides and salts of copper, zinc and manganese. The composition can contain high concentrations of sulfur, copper, zinc and manganese without attendant precipitation problems and is compatible with most conventional liquid fertilizers which are used to provide nutrients such as nitrogen, phosphorus and potassium. Accordingly, it is an object of this invention to provide an improved fertilizer composition.

A further object of the invention is to provide a process for the preparation of an improved fertilizer composition which comprises mixing water, ammonium thiosulfate, ammonia and a metal source comprising at least one metal compound selected from the group consisting of the oxides and salts of copper, zinc and manganese to produce an aqueous solution, wherein the amount of ammonia is sufficient to solubilize the metal source.

A still further object of this invention is to provide an improved method of fertilizing soil which comprises applying to said soil an effective amount of an aqueous solution of ammonium thiosulfate, ammonia and a metal source comprising at least one metal compound selected from the group consisting of the oxides and salts of copper, zinc and manganese.

Other objectives, aspects and advantages of the invention will be readily apparent from the following detailed description and claims.

DETAILED DESCRIPTION OF THE INVENTION

The fertilizer composition of this invention can be prepared using solid ammonium thiosulfate. Alternatively, the ammonium thiosulfate and at least a portion of the water can be provided in the form of an aqueous ammonium thiosulfate solution. The use of an aqueous ammonium thiosulfate solution is particularly convenient in view of the fact that such solutions are conventionally used as fertilizers and are readily available. Commercially available aqueous ammonium thiosulfate solutions typically contain about 58–60% of ammonium thiosulfate and analyze for 12% nitrogen and 26% sulfur. The amount of ammonium thiosulfate used in preparing the fertilizer composition of this invention, on a dry solid basis, is from about 1 to about 60 percent by weight based on the total weight of the composition. For purposes of transportation and storage, it is generally desirable to produce a fertilizer composition having a high sulfur analysis. Accordingly, the amount of ammonium thiosulfate employed is preferably from about 20 to about 60 percent by weight based on the total weight of the composition.

The liquid fertilizer composition of this invention is prepared with a metal source which comprises at least one metal compound selected from the group consisting of the oxides and salts of copper, zinc and manganese. Preferably, however, the metal source comprises at least one metal compound selected from the group consisting of cupric, zinc and manganous salts as a consequence of their availability and desirable solubility properties. Although the nature of the anion of the salts is not critical, sulfate, nitrate and chloride are preferred because they provide, depending on the specific anion, sulfur, nitrogen or chlorine for plant nutrition. Zinc oxide is a highly desirable zinc compound for use in the practice of this invention because of its availability and low cost.

A preferred embodiment of this invention involves the use of both a manganese compound and a copper compound in the preparation of the liquid fertilizer composition. In the absence of copper and at relatively high manganese concentrations, there is a tendency for insoluble manganese compounds to precipitate from the fertilizer composition of this invention during periods of long storage. This precipitation does not occur if at least a small amount of a copper salt is also employed in the preparation of the composition.

The metal source employed in preparing the composition of this invention can be used in solid form. Alternatively, the metal source and at least a portion of the water can be provided in the form of an aqueous solution if the metal source is water soluble.

The metal source employed in the preparation of the composition of this invention is used in a proportion such that the amount of metal provided by said metal source is from about 0.01 to about 15 percent by weight of the total composition. For purposes of transportation and storage, it is generally desirable to provide a fertilizer composition having a high metal analysis. Accordingly, the proportion of metal source employed in the practice of this invention can be adjusted so that the amount of metal provided by the metal source is preferably from about 1 to about 15 percent by weight and more preferably from about 2 to about 15 percent by weight of the total composition.

The liquid fertilizer composition of this invention can be prepared with anhydrous ammonia. Alternatively, the ammonia and at least a portion of the water can be provided in the form of an aqueous ammonia solution. The proportion of ammonia employed in the practice of this invention is an amount which is sufficient to solubilize the metal source. This proportion is such that the ratio of moles of ammonia to gram-atoms of metal provided by the metal source is from about 1 to about 200 and preferably from about 2 to about 30. A very large ratio does not have a detrimental effect on metal source solubility but may render the handling of the resulting fertilizer composition unpleasant because of the irritating effect on eyes and nose of concentrated ammonia solutions.

In the preparation of the liquid fertilizer composition of this invention, the mixing conditions or order of addition of components are not critical. The preparation is desirably conducted at temperatures below about 90° C. and preferably below about 60° C. at atmospheric pressure, as a consequence of the volatility of both water and ammonia. If superatmospheric pressure is used, the preparation can be carried out at higher temperatures, but temperatures in excess of about 150° C. should not ordinarily be used in view of the thermal instability of ammonium thiosulfate. In addition, the preparation should not be carried out at temperatures substantially below about 0° C., the freezing point of water.

A preferred liquid fertilizer composition according to this invention comprises an aqueous solution of ammonium thiosulfate, ammonia and a metal source comprising at least one metal compound selected from the group consisting of the oxides and salts of copper, zinc and manganese, wherein the amount of ammonium thiosulfate on a dry solid basis is from about 1 to about 60 percent by weight of the solution, and the proportion of metal source is such that the amount of metal provided by said metal source is from about 0.01 to about 15 percent by weight of the solution.

The precise mechanism by which the ammonia acts to solubilize the metal source of this invention is unknown. It is possible, however, that coordination compounds are formed through interaction of the ammonia with the metal of the metal source. The formation of these coordination compounds may be responsible for the improved solubility of the metal source when combined with ammonium thiosulfate according to the present invention.

The stability of the liquid fertilizer composition of this invention at temperatures of about 0° C. or somewhat below can be further improved by the additional incorporation of ammonium sulfate. This is generally unnecessary, however, except for a composition having a high metal content.

The liquid fertilizer composition of this invention is useful per se as a source of nitrogen, sulfur and micronutrient metals for plant nutrition. The composition may be diluted either with water or with conventional liquid fertilizers which are used to provide nutrients such as nitrogen, phosphorus and potassium. Conventional fertilizers which are compatible with the composition of this invention include aqueous ammonia, nitrogen solutions containing ammonium nitrate, urea solutions and various grades of mixed N-P-K clear liquid and suspension fertilizers which contain ammonium phosphate, ammonium polyphosphate and potassium chloride.

No special equipment is necessary for the use of the liquid fertilizer composition of this invention other than the equipment which is utilized for the application of conventional liquid fertilizers. This application is ordinarily accomplished by spraying, although the composition of this invention can also be applied to the soil by dissolving in irrigation water.

The following examples are intended only to illustrate the invention and are not to be construed as imposing limitations on the invention.

EXAMPLE I

A solution was prepared by mixing 0.5 parts $CuSO_4.5H_2O$ (cupric sulfate pentahydrate), 18 parts manganese sulfate (analyzing for 28% Mn), 41 parts of 50–60% aqueous ammonium thiosulfate solution and 41 parts of aqueous ammonia (28% $NH_3$). The resulting blue solution contained 5% manganese and 0.13% copper. The amount of ammonium thiosulfate employed in the preparation was 24% by weight based on the total mixture, and 7.5 moles of ammonia were employed in the preparation per gram-atom of manganese and copper. If the copper was omitted, dark oxides of manganese formed during storage. The blue solution was indefinitely stable and could be mixed with a commercial 7-23-5 liquid fertilizer to provide a composition containing 0.1% manganese. The 7-23-5 fertilizer was an aqueous solution of ammonium phosphate, ammonium polyphosphate and potassium chloride which analyzed for 7% nitrogen, 23% $P_2O_5$ and 5% $K_2O$ and wherein about 50% of the $P_2O_5$ content was in the form of polyphosphate.

EXAMPLE II

To a mixture of 20.6 parts water and 26.8 parts of aqueous ammonia (28% $NH_3$) was added with stirring 12.6 parts of zinc oxide followed by 40.0 parts of 58–60% aqueous ammonium thiosulfate solution. The resulting solution contained 10% zinc, had a pH of 11.2 and had a specific gravity of 1.226 at 22° C. The amount of ammonium thiosulfate employed in the preparation was 24% by weight based on the total mixture, and 2.9 moles of ammonia were employed in the preparation per gram-atom of zinc.

EXAMPLE III

A solution was prepared by mixing 3.6 parts zinc oxide, 0.5 parts $CuSO_4.5H_2O$ (cupric sulfate pentahydrate), 10.0 parts manganese sulfate (analyzing for 28% Mn), 153 parts aqueous ammonia (28% $NH_3$) and 233 parts of 58–60% aqueous ammonium thiosulfate solution. The resulting solution was indefinitely stable and contained 0.72% zinc, 0.032% copper and 0.70% manganese. The amount of ammonium thiosulfate employed in the preparation was 34% by weight based on the total mixture, and 26 moles of ammonia were employed in the preparation per gram-atom of zinc, copper and manganese. The solution blended well with the 7-23-5 liquid fertilizer described in Example I. Application of the solution at a rate of 10 kg per hectare of agricultural soil using conventional spray equipment provides 1.5 kg of sulfur, 3.2 g of copper, 70 g of manganese, and 72 g of zinc per hectare for plant nutrition.

EXAMPLE IV

A solution was prepared by mixing 3.6 parts zinc oxide, 10.0 parts manganese sulfate (analyzing for 28% Mn), 153 parts aqueous ammonia (28% $NH_3$) and 233 parts of 58-60% aqueous ammonium thiosulfate solution. The resulting solution contained 0.72% zinc and 0.70% manganese. The amount of ammonium thiosulfate employed in the preparation was 34% by weight based on the total mixture, and 26 moles of ammonia were employed in the preparation per gram-atom of zinc and manganese. The solution blended well with the 7-23-5 liquid fertilizer described in Example I.

EXAMPLE V

A solution was prepared by mixing 12.6 parts zinc oxide, 20.4 parts aqueous ammonia (28% NH$_3$) and 67.0 parts of 58-60% aqueous ammonium thiosulfate solution. The resulting solution was clear and contained 10% zinc. The amount of ammonium thiosulfate employed in the preparation was 40% by weight based on the total mixture, and 2.2 moles of ammonia were employed in the preparation per gram-atom of zinc. The solution blended well with the 7-23-5 liquid fertilizer described in Example I. When water was substituted for aqueous ammonia in the preparation, a mixture was obtained which never became clear and contained much solid.

EXAMPLE VI

A solution was prepared by mixing 12.6 parts zinc oxide, 37.4 parts aqueous ammonia (28% NH$_3$) and 50.0 parts of 58-60% aqueous ammonium thiosulfate solution. The resulting solution was clear and contained 10% zinc. The amount of ammonium thiosulfate employed in the preparation was 30% by weight based on the total mixture, and 4.0 moles of ammonia were employed in the preparation per gram-atom of zinc. The solution blended well with the 7-23-5 liquid fertilizer described in Example I. When water was substituted for aqueous ammonia in the preparation, a mixture was obtained which never became clear and contained much solid.

EXAMPLE VII

A solution was prepared by mixing 27.8 parts zinc sulfate (analyzing for 36% Zn), 36.1 parts aqueous ammonia (28% NH$_3$) and 36.1 parts of 58-60% aqueous ammonium thiosulfate solution. The resulting solution was clear and contained 10% zinc. The amount of ammonium thiosulfate employed in the preparation was 21% by weight based on the total mixture, and 3.9 moles of ammonia were employed in the preparation per gram-atom of zinc. The solution blended well with the 7-23-5 liquid fertilizer described in Example I. When water was substituted for aqueous ammonia in the preparation, a mixture was obtained which never became clear and contained much solid.

We claim:

1. A liquid fertilizer composition comprising an aqueous solution of ammonium thiosulfate, ammonia and a metal source comprising at least one metal compound selected from the group consisting of the oxides and salts of copper, zinc and manganese, wherein the amount of ammonium thiosulfate is from about 20 to about 60 percent by weight of the solution, the proportion of metal source is such that the amount of metal provided by said metal source is from about 1 to about 15 percent by weight of the solution, and the amount of ammonia is such that the ratio of moles of ammonia to gram-atoms of said metal is from about 2 to about 30.

2. The composition as set forth in claim 1 wherein the proportion of metal source is such that the amount of metal provided by said metal source is from about 2 to about 15 percent by weight of the solution.

3. The composition as set forth in claim 1 wherein the metal source comprises both a manganese compound and a copper compound.

4. A method of preparing a liquid fertilizer composition which comprises mixing water, ammonium thiosulfate, ammonia and a metal source comprising at least one metal compound selected from the group consisting of the oxides and salts of copper, zinc and manganese to produce an aqueous solution, wherein the amount of ammonium thiosulfate is from about 20 to about 60 percent by weight of the solution, the proportion of metal source is such that the amount of metal provided by said metal source is from about 1 to about 15 percent by weight of the solution, and the amount of ammonia is such that the ratio of moles of ammonia to gram-atoms of said metal is from about 2 to about 30.

5. The method as set forth in claim 4 wherein the ammonium thiosulfate and at least a portion of the water is provided in the form of an aqueous ammonium thiosulfate solution.

6. The method as set forth in claim 4 wherein the ammonia and at least a portion of the water are provided in the form of an aqueous ammonia solution.

7. The method as set forth in claim 4 wherein the proportion of metal source is such that the amount of metal provided by said metal source is from about 2 to about 15 percent by weight of the solution.

8. A method of fertilizing soil which comprises applying to said soil an effective amount of the composition of claim 1 for improving the fertility of said soil.

9. A method of fertilizing soil which comprises diluting the composition of claim 1 with water and applying to said soil an effective amount of the diluted composition for improving the fertility of said soil.

10. A method of fertilizing soil which comprises diluting the composition of claim 1 with a liquid fertilizer comprising an aqueous solution of at least one material selected from the group consisting of ammonia, ammonium nitrate, urea, ammonium phosphate, ammonium polyphosphate, and potassium chloride, and applying to said soil an effective amount of the diluted composition for improving the fertility of said soil.

11. The method as set forth in claim 9 or 10 wherein said composition is diluted to an ammonium thiosulfate concentration which is not less than about 1 percent by weight of the diluted composition.

* * * * *